United States Patent
Wilson (12)

(10) Patent No.: US 6,917,764 B1
(45) Date of Patent: Jul. 12, 2005

(54) PREDISTORTION CIRCUIT WITH COMBINED ODD-ORDER AND EVEN-ORDER CORRECTION

(75) Inventor: Gordon C. Wilson, New York, NY (US)

(73) Assignee: Emcore Corporation, Somerset, NJ (US)

( * ) Notice: Subject to any disclaimer, the term of this patent is extended or adjusted under 35 U.S.C. 154(b) by 612 days.

(21) Appl. No.: 09/675,434

(22) Filed: Sep. 29, 2000

(51) Int. Cl.[7] .......................... H04B 10/04; H04B 10/12
(52) U.S. Cl. ...................... 398/193; 398/194; 398/159; 375/296; 330/149
(58) Field of Search ............................... 398/192, 193, 398/194, 159; 375/296; 330/149

(56) References Cited

U.S. PATENT DOCUMENTS

| | | | |
|---|---|---|---|
| 4,588,958 A | * 5/1986 | Katz et al. ................... 330/149 |
| 5,282,072 A | * 1/1994 | Nazarathy et al. ........... 398/193 |
| 5,373,384 A | * 12/1994 | Hebert ......................... 398/193 |
| 5,436,749 A | * 7/1995 | Pidgeon et al. ............. 398/193 |
| 5,453,868 A | * 9/1995 | Blauvelt et al. ............. 398/199 |
| 5,812,294 A | * 9/1998 | Wilson ........................ 398/194 |
| 6,072,616 A | 6/2000 | Cohen et al. ................ 359/187 |
| 6,313,701 B1 | * 11/2001 | Mussino et al. ............. 330/149 |
| 6,559,994 B1 | * 5/2003 | Chen et al. .................. 359/180 |

OTHER PUBLICATIONS

Nazarathy et al. "Progress in Externally Modulated AM CATV Transmission Systems" Journal of Lightwave Technology, vol. 11, No. 1, pp. 82–105, Jan. 1993.

Wilson et al. "Predistortion of Electroabsorption Modulators for Analog CATV Systems at 1.55μm" Journal of Lightwave Technology, vol. 15, No. 9, pp. 1654–1661, Sep. 1997.

* cited by examiner

Primary Examiner—Kinfe-Michael Negash
(74) Attorney, Agent, or Firm—Christie, Parker & Hale, LLP

(57) ABSTRACT

An apparatus and associated method for generating predistortion IMD in a predistortion circuit. The method comprising adjusting the bias voltage, adjusting the bias current; adjusting the gain of the amplifier; and adjusting the differential bias current flowing through each diode in an antiparallel diode pair. In one aspect, the bias voltage, the bias current, the gain of the amplifier, and the differential bias current can be iteratively adjusted to generate both even-order and odd-order predistortion IMD.

30 Claims, 11 Drawing Sheets

PREDISTORTION CIRCUIT WITH COMBINED ODD-ORDER AND EVEN-ORDER CORRECTION

BACKGROUND OF THE DISCLOSURE

1. Field of the Invention

The present invention relates to optical communication transmitters and, more particularly, to predistortion circuits used with optical communication transmitters.

2. Description of the Background Art

There are multiple laser/modulator configurations. A design goal of most of these configurations is to limit nonlinearities of the output photonic signal generated in response to the input signal. One embodiment of optical transmission systems include directly modulated lasers whose outputs are connected to optical amplifiers and single mode optical fiber links. The use of erbium-doped fiber amplifiers (EFDA's) in one embodiment of optical transmission system, i.e. AM VSB cable TV (cable TV or CATV) systems operating at, for example, a wavelength of 1.55 µm, is desirable because the EFDAs can provide high power output photonic signals. Splitters utilized in networks such as AM-VSB cable TV systems typically feed into a plurality of output fiber branches having variable lengths. Each output photonic signal is transmitted over optical fiber links to a distinct optical receiver. High power output photonic signals from the EFDAs have high splitting ratios and therefore can be split into multiple signals by the splitter, with certain different ones of the multiple signals following different fiber links.

Both lasers and modulators exhibit distortions that can result in signal degradation. Chirp is an undesired shifting and broadening, i.e., a distortion, of the output spectrum of a laser at relatively high modulation frequencies.

Unfortunately, the chirp produced by directly modulated DFB lasers leads to signal distortion in fiber with chromatic dispersion at the operating wavelength and in EDFAs having a gain that varies with wavelength. Thus, AM-VSB cable TV systems require either dispersion compensation or external modulation to compensate for the signal distortion.

In dispersion compensation for directly compensated lasers, a dispersion-compensating fiber is installed in each existing fiber branch to compensate for the distortion. Each dispersion compensation fiber is configured to compensate for the different splitter output branch lengths. Dispersion compensation is labor-intensive, cumbersome, costly, and complicates the construction and/or expansion of networks.

Another laser/modulator configuration includes external modulation lasers in which the output of the laser is coupled to the input of a distinct externally modulated source. The output of the externally modulated source connects to the existing fiber. Externally modulated sources produce a low chirp, thereby obviating the need for dispersion compensation. A LiNbO$_3$ Mach-Zender modulator is a commercially available externally modulated source, but that is relatively expensive.

Electroabsorption (EA) modulators are another form of external modulation in which the modulator is integrated onto the same wafer as the laser. Electroabsorption modulated lasers (EMLs) are a type of EA modulator/laser in which the laser and abutted modulator are integrated into the same element by being grown on the same wafer. EMLs also produce a low chirp, are compact, and are potentially less expensive than other externally modulated sources.

A nonlinear transfer function (output power vs. input bias voltage) of a modulator typically has an inflection point. The inflection point is represented by where the second derivative of the curve is zero. Biasing the modulator at the inflection point of its transfer function minimizes composite second-order (CSO) distortions. In some devices, this relatively low CSO is still unacceptably high. The nonlinearity of the transfer function, parameterized by the composite-triple-beat (CTB) that represents the third-order distortion is high at the bias point that minimizes the CSO.

Various linearization techniques have been proposed for modulators in optical transmission systems. An EA modulator, for example, displays a substantially linear light vs. current transfer function at lower frequencies since the photocurrent produced is nearly proportional to the light absorbed at frequencies up to about 10 Mhz. However, providing a linearization range in EA modulators of about 600 Mhz, such as could be utilized in high-frequency optical networks is difficult at these frequencies.

Feedforward is another linearization technique that is described in U.S. Pat. No. 6,072,616 that issued on Jun. 6, 2000 to Cohen et al. and entitled "APPARATUS AND METHODS FOR IMPROVING LINEARITY AND NOISE PERFORMANCE OF AN OPTICAL SOURCE" (incorporated herein by reference). Feedforward has not yet been demonstrated using EA modulators. Feedforward relates generally to a process of supplying an input signal generated by an optical source, and supplying the input signal to a receiver for use in correcting a signal received from the optical source. Feedforward typically requires the use of a second laser at the transmitter. The linearization effectiveness of feedforward is limited to those instances where the wavelength of the primary transmitting laser match the wavelength of the second modulating laser. Where the wavelengths of the two lasers differ, the two signals will arrive at the receiver having undergone different delays.

Predistortion is presently the predominant technique for linearizing directly modulated lasers and Mach-Zehnder modulators and it is also regarded as being the most promising technique for linearizing EA modulators. The article by M. Nazarathy et al. entitled "Progress in Externally Modulated AM CATV Transmission Systems", J. Lightwave Technology., vol. 11, pp. 82–104 (1993) describes a correction technique for CTE distortion in which a linearizer signal is combined into the signal upstream of an electro-optic modulator to provide a more linear output photonic signal from the modulator. In this article, the modulator and linearizer transfer characteristics are modeled as an odd-function power series expansion. A distortion limiting of up to the third-order term of the expansion is reported. The Nazarathy et al. reference does not disclose a technique by which fifth-order predistortion intermodulation distortion (IMD) or even-order predistortion IMD, may be independently controlled.

Some predistortion circuits have used separate signal paths to generate even-order and odd-order predistortion IMD. For example, a first signal path of the predistortion circuit contains signal components that limit second-order modulator IMD. A second signal path of the predistortion circuit contains signal components that limit third-order modulator IMD. A third signal path of the predistortion circuit contains signal components that limit fourth-order modulator IMD. The first, second, and third signal paths have to be connected with their outputs each being input into the modulator. More complex and expensive splitting, timing (i.e. delay), and combining devices are required for predistortion circuits including multiple signal paths compared to predistortion circuits with a single signal path. The predistortion circuits relying on separate signal paths result in greater cost, additional components that can fail, and reduced performance (due to the added signal-strength attenuation and frequency response imperfections).

Therefore, a need exists in the art for a predistortion circuit that can compensate for even-order and odd-order IMD.

SUMMARY OF THE INVENTION

The invention relates generally to laser modulators. More specifically, an apparatus and associated method for generating predistortion IMD in a predistortion circuit. The method comprising adjusting the bias voltage, adjusting the bias current; adjusting the gain of the amplifier; and adjusting the differential bias current flowing through each diode in an antiparallel diode pair. In one aspect, the bias voltage, the bias current, the gain of the amplifier, and the differential bias current can be iteratively adjusted to generate both even-order and odd-order predistortion IMD.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The predistortion circuit outputs a signal including predistortion intermodulation distortion (IMD) into the modulator that limits even-order as well as odd-order modulator IMD that is included in the signal output from the modulator.

The inclusion of the modulator IMD in the output signal from the modulator are reflected in a nonlinear transfer function of the modulator. In one biasing scenario, the predistortion circuit may be biased to generate odd-order predistortion IMD to correct odd-order modulator IMD. In another biasing scenario, the predistortion circuit may be biased to generate both even-order and odd-order predistortion IMD to correct both even-order and odd-order modulator IMD. This disclosure describes the optical transmitter and predistortion circuit. The first biasing scenario and the second biasing scenario are also described.

Even-Order/Odd-Order Predistortion Circuit

Figure 1:
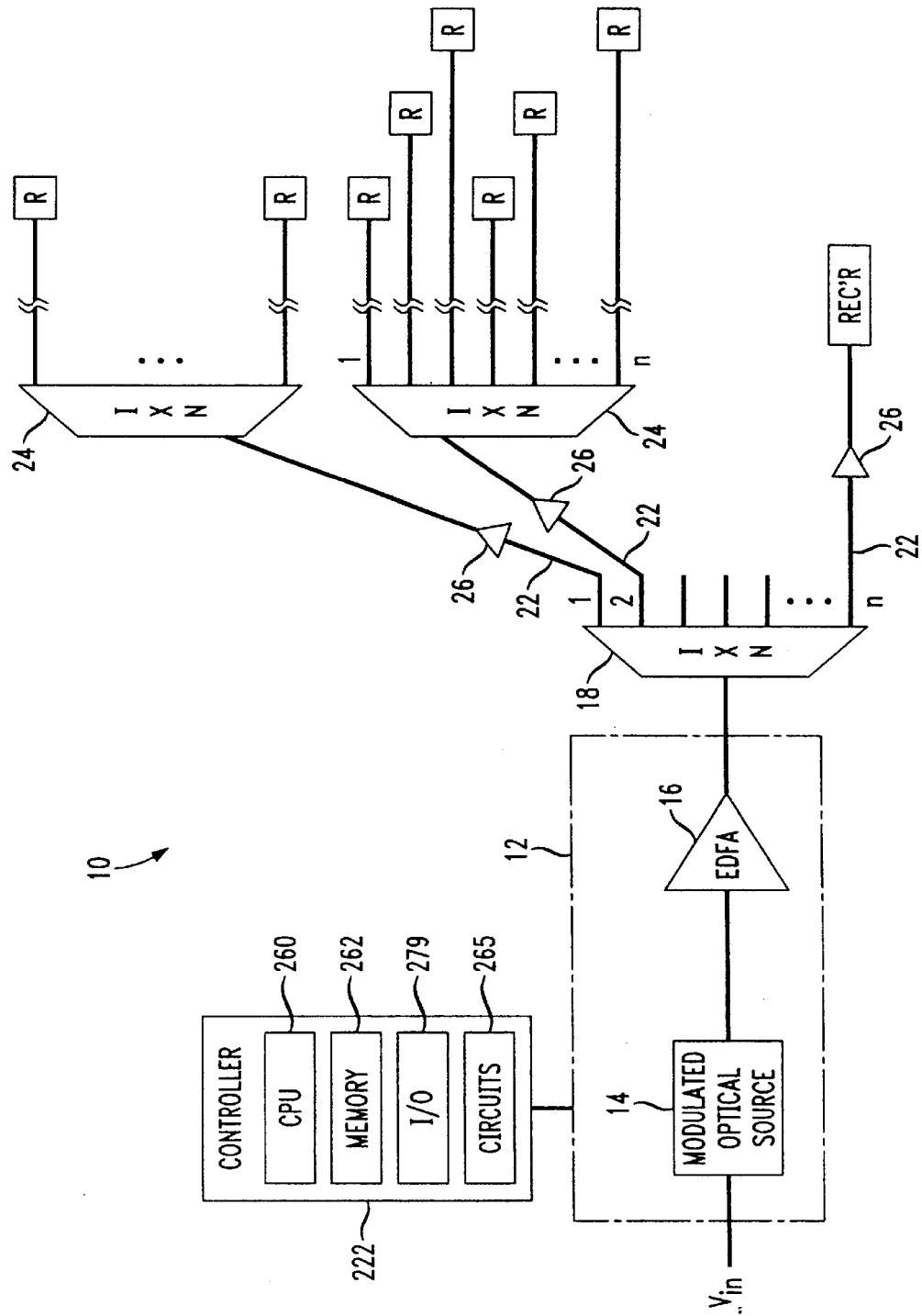
FIG. 1 shows one embodiment of an optical source distribution network employing a linearized optical transmitter in accordance with the present invention.
Figure 2:
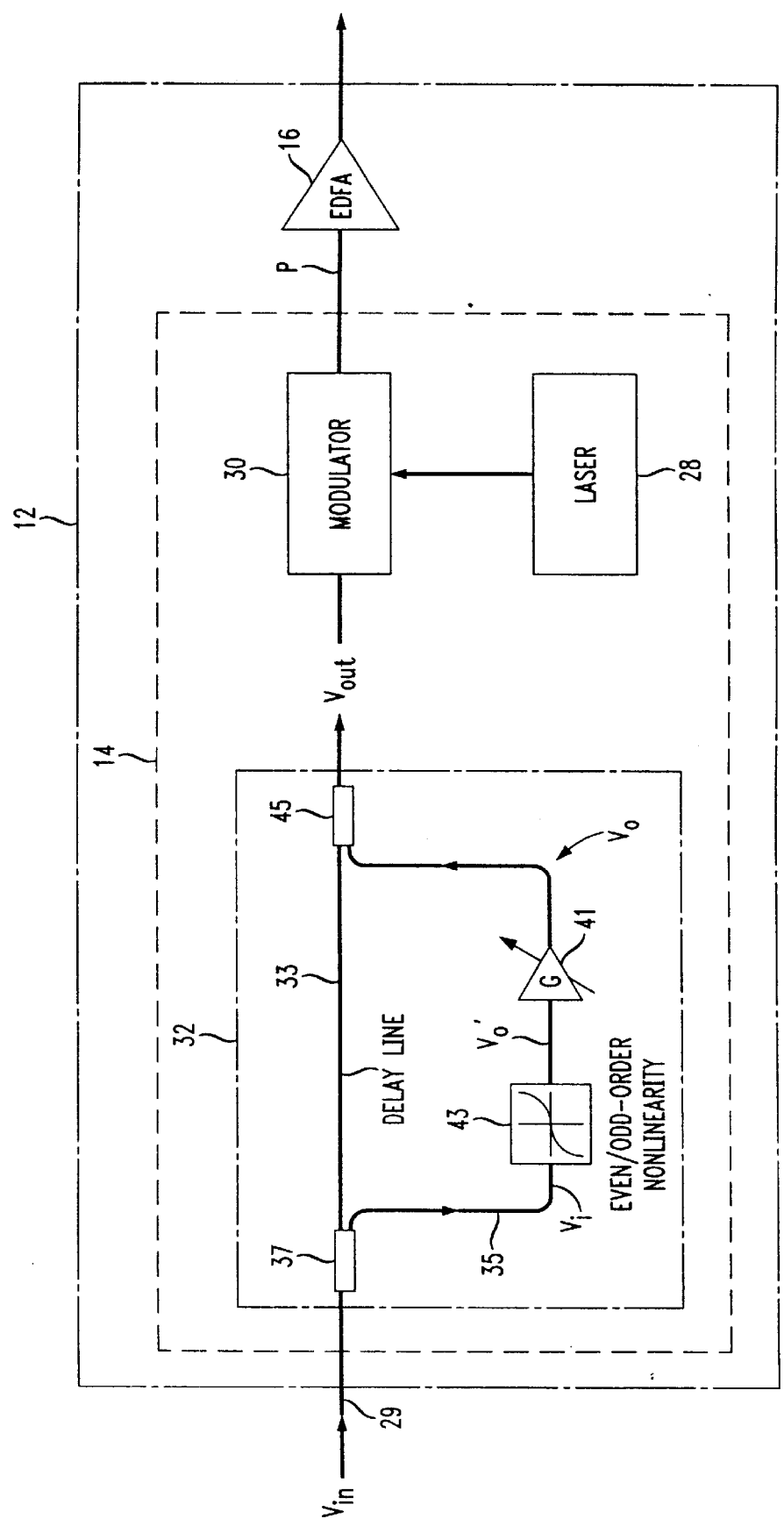
FIG. 2 shows one embodiment of a linearized optical transmitter constructed in accordance with an illustrative embodiment of the present invention.

FIG. 1 schematically illustrates one embodiment of an optical source distribution network 10 including a linearized optical transmitter 12. The linearized optical transmitter 12 is typically located at the central office (CO) of a telecommunications network. The optical source distribution network 10 includes an even/odd-order nonlinearity circuit 32, a controller 222, and a modulator 30, one embodiment of which is shown in FIG. 2. Depending upon the biasing, the predistortion circuit can generate even-order and/or odd-order predistortion IMD that limits even-order and/or odd-order modulator IMD.

The optical source distribution network 10 further comprises a plurality of 1×N power splitters 18, 24, a plurality of optical communication links 22 (such as fiber), and a plurality of receivers R. One embodiment of linearized optical transmitter 12, shown in FIG. 2, comprises a modulated optical source 14 and an amplifier 16. The amplifier 16 in a preferred embodiment may be an erbium-doped fiber amplifier (EFDA). The modulated optical source 14 comprises an integrated electroabsorption modulator 30, a distributed feedback laser 28, and the predistortion circuit 32. The embodiment of predistortion circuit 32 shown in FIGS. 2 and 4 comprises a delay line 33 and a line 35, an even/odd-order nonlinearity circuit 43, a splitter 37, output directional coupler 45, and a variable-gain amplifier 41. The laser 28, in one embodiment, is a distributed feedback laser that operates in a wavelength range centered about 1.55 $\mu$m though any laser can be applied to the optical source distribution network. In one embodiment, the laser 28 output is modulated by the electroabsorption (EA) modulator 30. The EA modulator may, or may not, be physically integrated with the laser 28. The laser 28 generates an output photonic signal that is input into the modulator. A signal P that is output from the modulator 30 in response to the output photonic signal is input into the EDFA 16.

Figure 3:
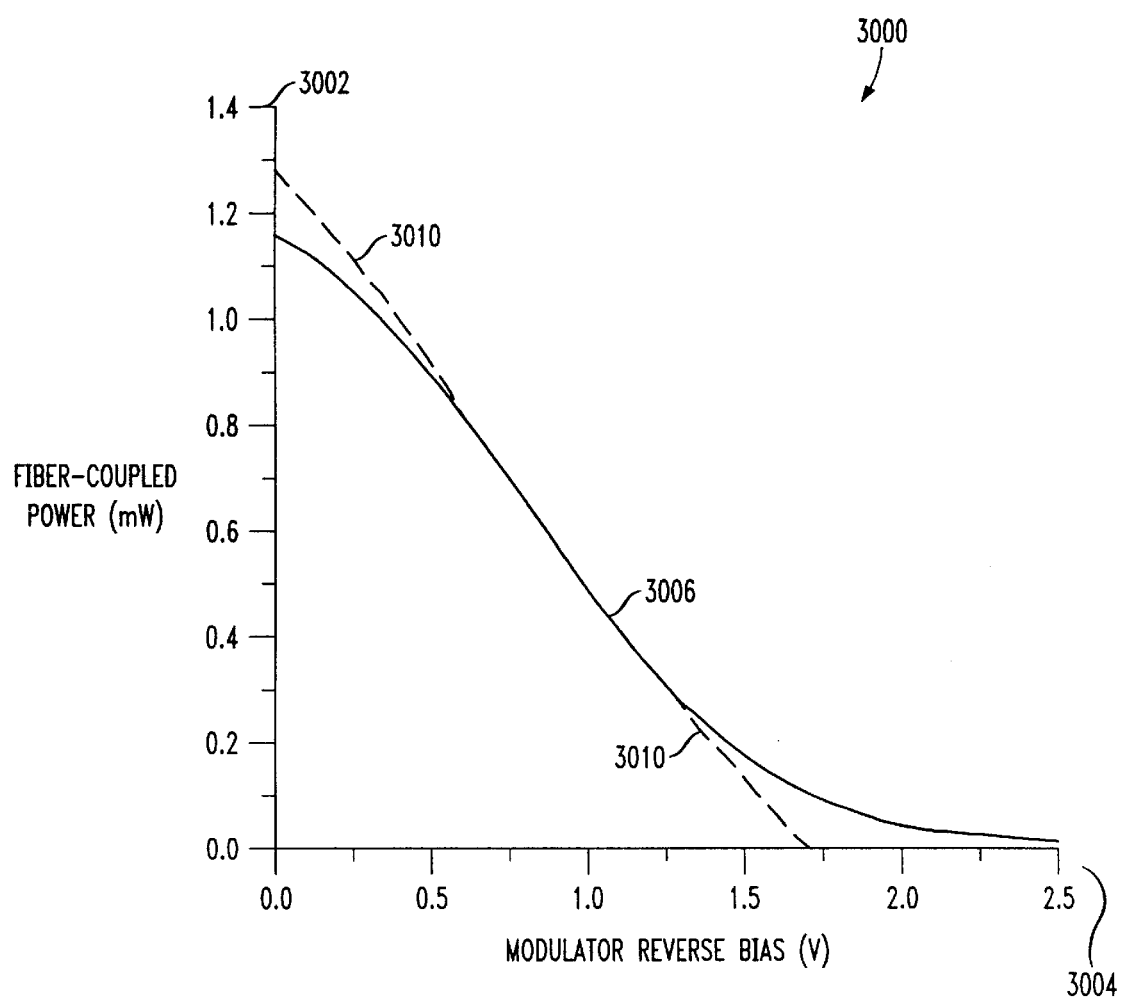
FIG. 3 is a graphical plot depicting the transmission vs. voltage curve of the electroabsorption modulator employed in the illustrative embodiment of FIG. 2.

FIG. 3 shows one embodiment of a graph 3000 plotting the nonlinearity of an output photonic signal P from the modulator 30 as the ordinate 3002 versus the input signal $V_{OUT}$ to the modulator 30 from the predistortion circuit 32 as the abscissa 3004. If the transfer function of the modulator were linear, then the curve 3006 would be straight as indicated by dotted line 3010.

The predistortion circuit generates predistortion IMD, of one or more orders, to compensate for modulator IMD to the transfer function of the modulator. The predistortion circuit 32 in conjunction with modulator bias control may be configured to limit one or more of the second-order, third-order, fourth-order, or fifth-order modulator IMD simultaneously by the predistortion circuit inputting second-order, third-order, fourth-order, and fifth-order predistortion IMD, respectively. Composite second-order distortion (CSO) parameterizes the even-order modulator IMD within a given RF channel, and can be applied to multicarrier CATV system. Composite-triple-beat (CTB) parameterizes the odd-order modulator IMD within a given RF channel, and can be applied to multicarrier CATV systems.

Figure 4:
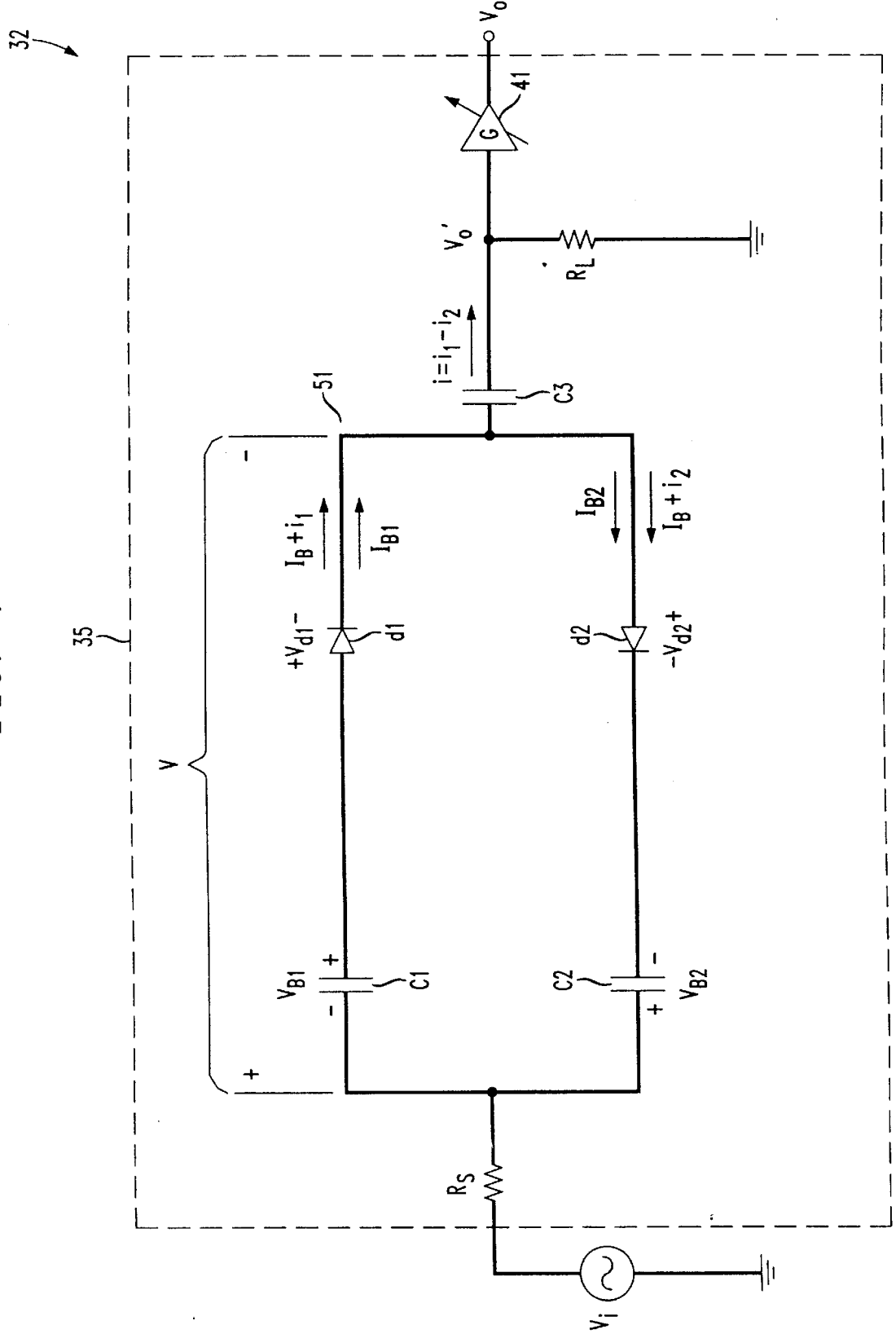
FIG. 4 shows one embodiment of predistortion circuit utilized by the linearized transmitter of FIG. 2.

FIG. 4 shows one embodiment of circuit components to be used in a predistortion circuit 32 of FIG. 2 including the even/odd-order nonlinearity circuit 43 and the amplifier 41. The even/odd-order nonlinearity circuit 43 compensates for one or more orders of nonlinearity in the transfer function of the modulator 30, such nonlinearity is shown in FIG. 3, depending on the biasing. The amplifier 41 of the predistortion circuit 32 generates signal $V_o$, that is combined by combiner 45 with the signal of the delay line 33 to form the predistorted signal $V_{OUT}$. The predistorted signal $V_{OUT}$ is forwarded to the modulator. The predistorted signal $V_{OUT}$ comprises both multiple subcarrier signals and IMD. Altering the predistortion IMD has the effect of altering, i.e. boosting or reducing, the amplitude of the output photonic signal P from the modulator. Predistortion IMD may be considered as signal components, generated by the predistortion circuit, that provides an effect on the signal downstream of the modulator that is substantially equal in magnitude and opposite in phase to the modulator IMD output by the modulator 30.

The predistortion circuit 32 shown in FIG. 4 comprises an antiparallel diode pair (comprising diodes d1 and d2 that are mounted in an antiparallel manner). The antiparallel diodes d1 and d2 of the antiparallel diode pair display an odd-order circuit symmetry that produce an odd-order IMD due to their inverted configuration. The predistortion circuit 32 generates a predistorted signal, $v_o$, in response to the time-varying input signal $v_i$.

The predistorted signal $v_o$ is supplied to the input of the electroabsorption modulator 30. Within the predistortion circuit 32 shown in FIG. 2, the input line 29 carrying the input signal $v_{in}$ is divided into two signals by splitter 37. A first signal travels via the delay line 33 while the second signal travels via line 35. The line 35 includes the even/odd order nonlinearity circuit 43 and the variable-gain amplifier 41. The even/odd-order nonlinearity circuit 43 generates IMD that compensates for nonlinearity in the transfer function of the modulator 30. The output signal of the line 35 is combined with the delay line 33 by a combiner 45 to form the predistorted signal $v_i'$. The variable-gain amplifier 41 can vary its gain G to control the amplitude of the signal output from the amplifier, containing the IMD, relative to the strength of the signal in the delay line 33. The delay of the delay line 33 is timed so a signal being delayed in the delay line 32 is in phase with a signal that passed through the even/odd order nonlinearity circuit 43 in series with the variable-gain amplifier 41. Both the signal from the delay line 32 and the output signal from the variable-gain amplifier 41 (including the IMD) are combined at the output directional coupler 45.

Capacitors C1 and C2, having respective voltages $V_{B1}$ and $V_{B2}$ by the bias current, $I_B$, that flows through each respective antiparallel diode d1 and d2 of the antiparallel diode pair. To provide the odd-order current impedance function, the diode d1 is biased with the same current, but in the reversed direction, as the diode d2. Therefore, for those antiparallel diode pairs that display odd-symmetry, $I_B=I_{B1}=I_{B2}$, and since all current in loop circuit 51 is maintained in the loop circuit, $i_1=i_2$ in the embodiment shown in FIG. 4.

The modulated optical source 14 generates a time varying optical output photonic signal P in response to a time varying electrical input signal $v_{in}$. The time varying optical output photonic signal P contains multiple subcarriers. Because of the odd symmetry of the transfer function of the antiparallel diodes d1 and d2 contained in the modulated optical source, only odd-order predistortion IMD are produced by the predistortion circuit when a uniform current flows through both antiparallel diodes d1 and d2. When the current flowing through diode d1 does not equal the current flowing through the diode d2, even-order as well as odd-order predistortion IMD are produced by the predistortion circuit.

In the optical source distribution network 10 of FIG. 1, the output of the modulated optical source 14 is amplified by the EDFA 16. The output of the EDFA is supplied to the 1×N power splitter 18 for transmission to the plurality of receivers R via respective optical communication links 22. As will be readily appreciated by those skilled in the art, extensive power splitting and amplification is typically employed within optical networks such as optical source distribution network 10 so a signal P generated by the modulator 30 may be utilized by a large number of subscriber locations. For illustrative purposes, one additional stage of power splitters 24 and optical amplifiers 26 is included in certain optical communication links 22 as shown in FIG. 1.

The signal produced by the even/odd order nonlinearity 43 in line 35, is amplified and recombined with the signal produced by delay line 33 at the output directional coupler. Odd-order modulator IMD that would otherwise be present in the output photonic signal P are substantially limited through the fifth order by the addition of predistortion IMD into the signal input into the modulator by the predistortion circuit. The signal output from the modulator is linearized to $N^{th}$-order occurs if the $2^{nd}$-order to $N^{th}$-order predistortion IMD produced by the predistortion circuit are equal in magnitude and opposite in phase to the $2^{nd}$-order to $N^{th}$-order modulator IMD produced by the modulator. Circuit design parameters and control settings, such as resistance, of certain of the circuit components, e.g. varistors, can be selected and/or controlled to cause the predistortion circuit to compensate for modulator IMD that results in nonlinearities of the modulator transfer function through the fifth-order.

The addition of predistortion IMD into the input signal to the modulator by the predistortion circuit 32 can compensate for the effects of modulator IMD in causing a nonlinear transfer function of the signal output from the modulator 30. One distinct predistortion circuit parameter has to be controllably adjusted to generate a distinct order of modulator IMD. For example, two adjustable circuit parameters must be controlled to generate third-order and fifth-order predistortion IMD to respectively compensate for the third-order and fifth-order modulator IMD. In the embodiments of the predistortion circuit 32 that $I_{B1}=I_{B2}=I_B$, the gain G of the variable-gain amplifier 41 is one adjustable circuit parameter that controls generation of one order of a predistortion IMD. The diode bias current $I_B$ is another adjustable circuit parameter that controls generation of the predistortion IMD.

It is likely that changing one parameter that effects the generation of predistortion IMDS may also influence the effect of another parameter that effects the generation of other orders of predistortion IMDS. The controller 222 containing a linear optimization program as described below can be operated to produce the parameters and control settings that result in generation of more optimized predistortion IMD.

In one embodiment, the antiparallel diodes d1 and d2 may have a junction capacitance of about 0.2 pF, but the voltage source $V_{IN}$ operates at relatively low frequencies, so this capacitance can be ignored to the first order. By analyzing the circuit, it can be shown that the current i flowing through the load resistor $R_L$ can be expressed as the following Taylor power series when the current flowing through diode d1 equals the current flowing through diode d2.

$$i = g_1 v_i + g_3 v_i^3 + g_5 v_i^5 + \quad (1)$$

where $v_i$ is the input voltage to the antiparallel diode pair and is some fraction of $v_{in}$ that depends on how much input power is coupled into the nonlinear circuit path.

U.S. Pat. No. 5,812,294, entitled "LINEARIZED OPTICAL TRANSMITTER", issued Sep. 22, 1998 to Gordon Wilson (incorporated herein by reference) contains the derivations of the above odd-order g coefficients $g_1$, $g_3$, and $g_5$). Based upon the derivation of the coefficients, the amount of predistortion of each order can be determined based upon the parameters of the circuit shown in FIG. 4. The voltage input to the amplifier 16 is $iR_L$. By varying the amplifier gain of amplifier 16, the amplitude of the predistortion IMD can be varied relative to the undistorted signal passing through the delay line. The fundamental power that passes through the line 35 (including the even/odd order nonlinearity 43 having antiparallel diodes d1 and d2), is proportional at low frequencies. The fundamental power applied to line 35 is much smaller than that which passes through the delay line. Varying the gain G of amplifier 41 varies all orders of predistortion IMD by the same ratio relative to the undistorted line passing through delay line 33, so another adjustable degree of freedom is necessary to independently tune the predistortion IMD3 and the redistortion IMD5 produced by the modulator.

The other adjustable parameter is the bias current $I_B$ that flows through the two antiparallel diodes d1 and d2. For a certain value of $I_B$, $g_5=0$; $g_1 \approx 0$, and $g_3 \approx 0$. Thus, by varying $I_B$ in the vicinity of the null, the relative phase of predistortion IMD3 and predistortion IMD5 can be changed by 180°, and their relative magnitudes can be varied over a broad range. To estimate the value of $I_B$ for which $g_5=0$, some approximations are made, resulting in the equation for nulling derived in the '294 patent:

$$I_B = \frac{1}{3\beta(6R + 7R_b)}$$

$g_5$ changes from a negative value to a positive value at this value of $I_B$.

For a certain combination of circuit parameters $g_5=0$, both the relative magnitude and relative phase of predistortion IMD3 and predistortion IMD5 can be varied over a broad range by varying $I_B$ in the vicinity of this null.

Adjusting the gain G of the variable-gain amplifier 41 so that the predistortion IMD3 and the predistortion IMD5 added to the signal by the predistortion circuit 16 limits the third-order modulator IMD and the fifth-order modulator IMD generated by the modulator 70. The amount of predistortion IMD5 relative to predistortion IMD3 predistortion can be controlled by selectively varying $I_B$ in conjunction with G.

Figure 5:
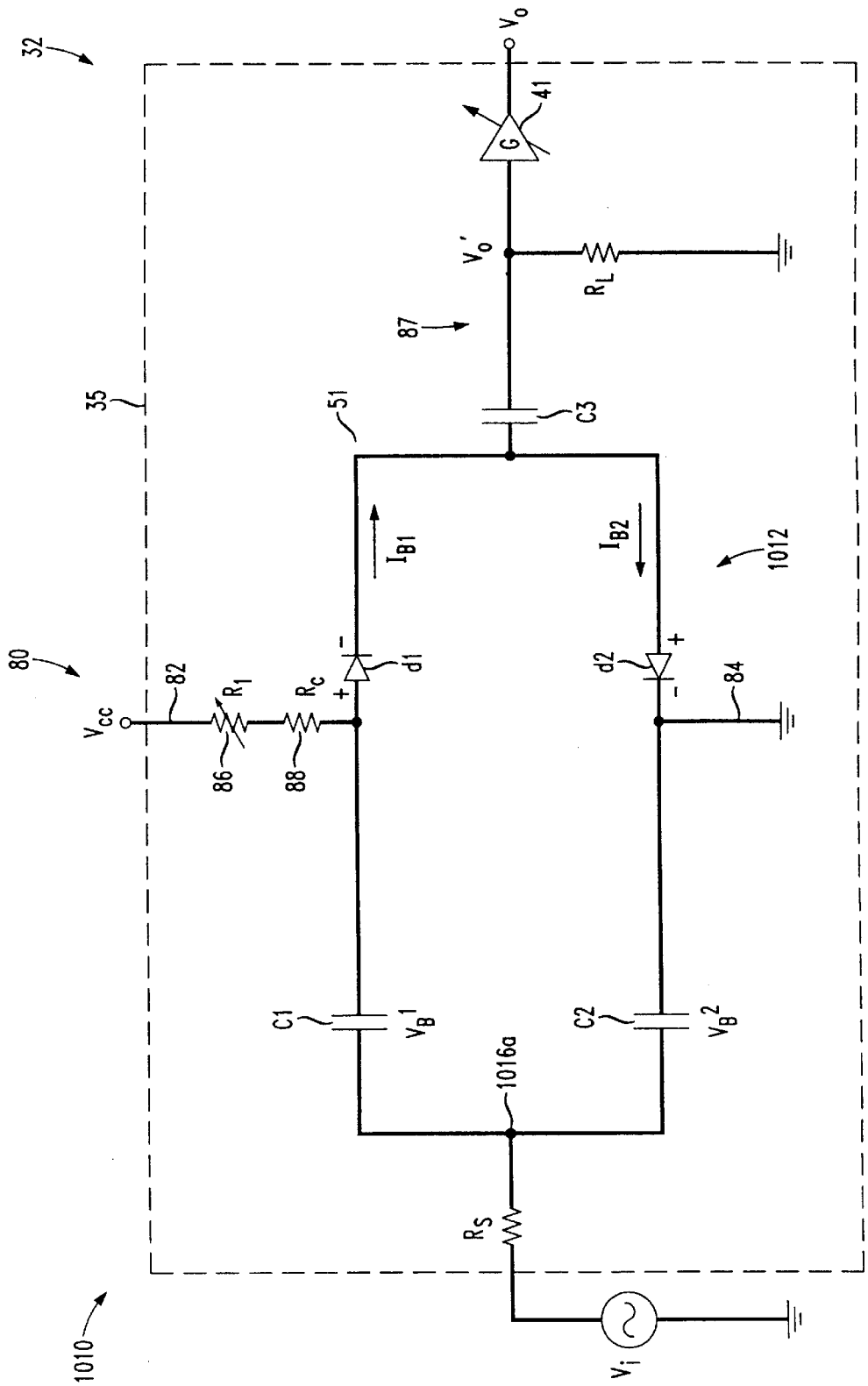
FIG. 5 shows an alternate embodiment of predistortion circuit from FIG. 4 including components that can be adjusted to vary the diode bias current $I_B$.

Control of the two adjustable circuit parameters $I_B$ and G are varied to generate two independent predistortion IMD to provide control of the ratio of predistortion IMD3 and predistortion IMD5. FIG. 5 shows an embodiment of predistortion circuit 32 that is modified from the predistortion circuit of FIG. 4 by the addition of an $I_B$ controller segment 80. The $I_B$ controller segment varies the current $I_B$ flowing through both antiparallel diodes d1 and d2. The $I_B$ controller segment 80 includes a $V_{cc}$ segment 82 and a ground segment 84. The ground segment 84 connects the negative side of diode d2 to ground. The $V_{cc}$ segment 82 comprises a varistor 86 having a resistance R1 and a resistor 88 having a resistance $R_c$. The varistor 86 and the resistor 88 are connected in series between a voltage source $V_{cc}$ and the positive side of diode d1.

As the resistance R1 of varistor 86 is varied, the resultant voltages applied across both antiparallel diodes d1 and d2 will vary as a function of the resistances in varistor 86 and resistor 88. The current flowing through the antiparallel diodes d1 and d2 will vary as a function of Ohm's law considering the combined resistances of the varistor 86 and the resistor 88. This embodiment Of $I_B$ controller segment 80 allows for variation of $I_B$, while maintaining $I_{B1}$ substantially equal to $I_{B2}$ since variations of the setting of varistor 86 effect the electric current/voltage in the loop circuit 51, and not the electric current/voltage in the amplifier portion 87 of the predistortion circuit 32. Since the $I_B$ controller segment 80 varies the current that flows through both antiparallel diodes d1 and d2 at substantially the same amount, the $I_B$ controller segment 80 generates odd-order predistortion IMD.

The above description relates primarily to biasing the predistortion circuit 32 to generate odd-order predistortion IMD to limit the odd-order modulator IMD. The following provides a description of providing biasing, and further circuits, to the predistortion circuit that generate both even-order and odd-order predistortion IMD to compensate respectively for both even-order and odd-order modulator IMD generated by the modulator. Modifying equation 1 to provide both even and odd-order coefficients yields:

$$i = g_1 v_i + g_2 v_i^2 + g_3 v_i^3 + g_4 v_i^4 + g_5 v_i^5 + \quad (2)$$

where $v_i$ is the input voltage to the antiparallel diode pair and is some fraction of $v_{in}$ that depends on how much input power is coupled into the nonlinear circuit path.

Figure 8:
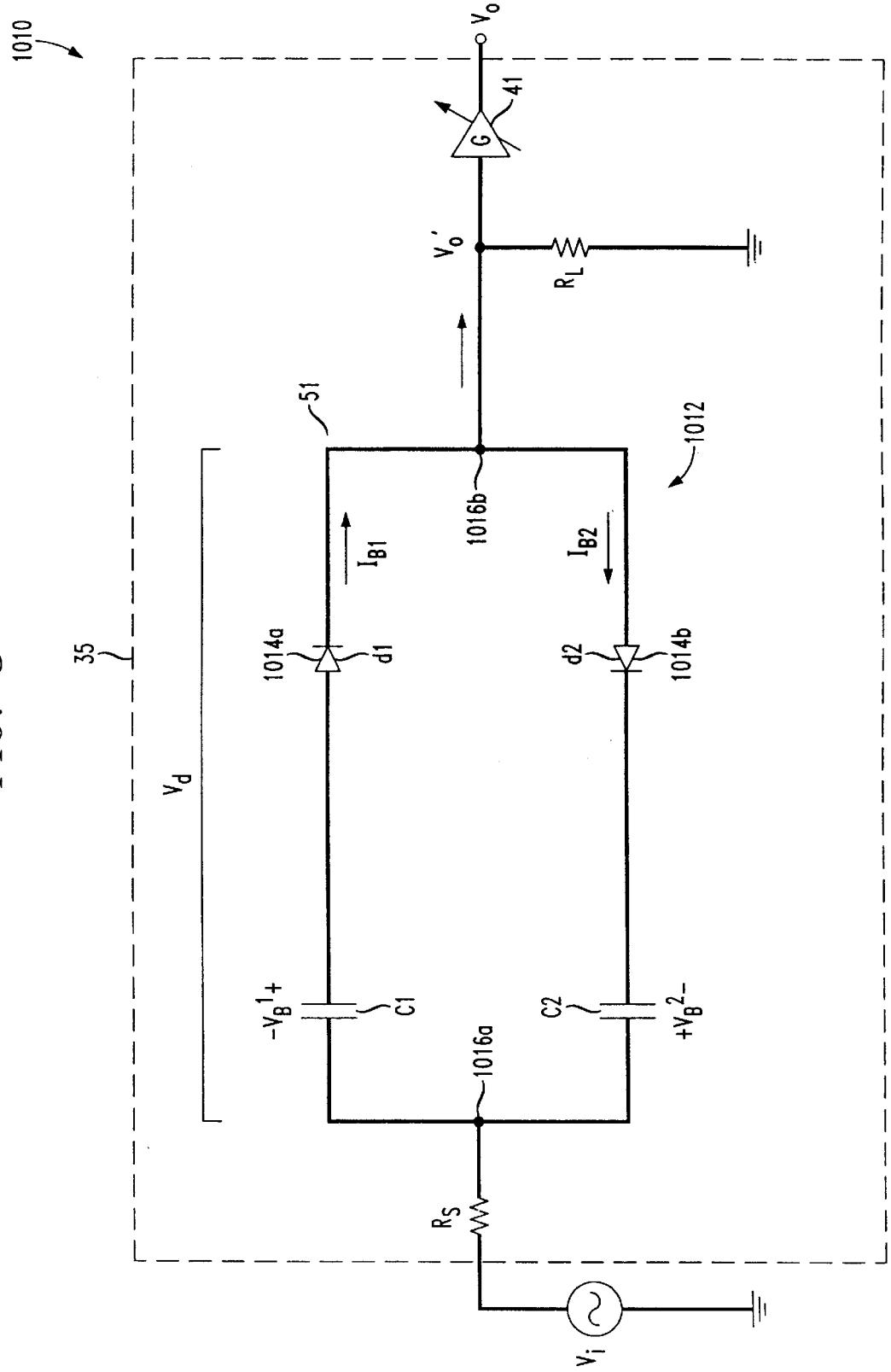
FIG. 8 shows another embodiment of predistortion circuit utilized by the linearized transmitter of FIG. 2.

FIG. 8 shows another diagram of the predistortion circuit 35 containing further controllable currents and voltages that can be varied to generate predistortion IMD to linearize the modulator IMD output by the modulator.

The predistortion circuit comprises the delay line 33, the signal path 35, the amplifier 16, and an even/odd order nonlinearity circuit 1010. The predistortion circuit includes a single signal path 35. The even/odd order nonlinearity circuit 1010 includes a plurality of antiparallel diodes 1014a, 1014b. Both antiparallel diodes 1014a and 1014b have similar operational characteristics. Electric current $I_{B1}$ flows across diode 1014a. Electric current $I_{B2}$ flows across diode 1014b. An electric voltage $V_d$ is applied across the nodes 1016a, 1016b of the antiparallel diode-pair circuit 1012, so some electric current flows from node 1016a to node 1016b (or vice versa). Therefore, electric current $I_{B1}$ does not necessarily equal the electric current $I_{B2}$ in this embodiment. The output ac voltage $v_o$ of the amplifier ($v_o'$ is the input voltage to variable-gain amplifier 41) can be expressed as a power series expansion of input ac voltage $v_i$.

$$v_0 = \sum_{j=1}^{\infty} \alpha_j v_1^j \quad (3)$$

If $I_{B1} = I_{B2}$ then all even-order values of j=0, and the analysis follows the above odd-order analysis. However, when $I_{B1} \approx I_{B2}$ then the odd-symmetry of the predistortion circuit is broken and some even-order predistortion IMD has to be generated to predistortion IMD being generated to compensate for odd-order modulator IMD. Depending on whether $I_{B1} > I_{B2}$ or $I_{B1} < I_{B2}$, the sign of the generated even-order predistortion IMD can be positive or negative, i.e., whether $\alpha_2 > 0$ or $\alpha_2 < 0$.

Figure 6:
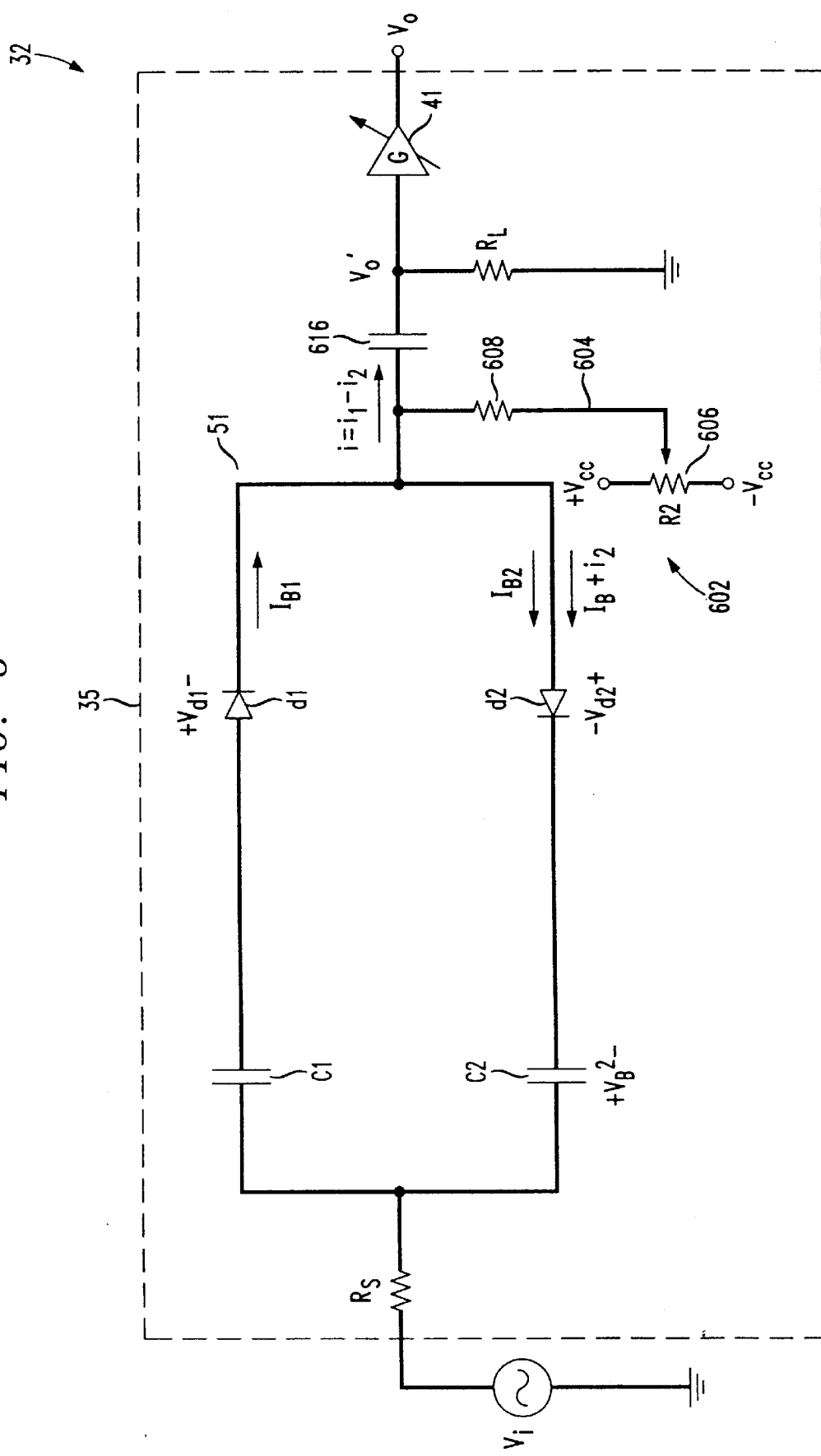
FIG. 6 shows an alternate embodiment of predistortion circuit from FIG. 4 including circuit components that can be adjusted to vary the difference in diode bias currents $I_{B1}$-$I_{B2}$.

An alternate embodiment of predistortion circuit 32 is shown in FIG. 6. The predistortion circuit in FIG. 6 includes a differential $I_B$ adjustment 602. The differential $I_B$ adjustment 602 adjusts the amplitude of the current $I_{B1}$ relative to the amplitude of the current $I_{Bw}$, shown in FIG. 8, that flows through the antiparallel diodes d1 and d2, respectively. Since the current provided by the differential $I_B$ adjustment 602 ensures that the current flowing through the antiparallel diodes d1 and d2 no longer are equal. The odd-order current flow symmetry between the antiparallel diodes is thus destroyed, and even-order predistortion IMD including second-order predistortion IMD2 and fourth-order predistortion IMD4 may be generated by the predistortion circuit 32 that compensate, respectively, for a second-order modulator IMD and a fourth-order modulator IMD.

The differential $I_B$ adjustment 602 provides for control of one additional order of linearization of the modulator transfer function. The differential $I_B$ adjustment 602 comprises a circuit path 604 including a resistor 608, a varistor 606, and a capacitor 616. One end of the varistor 606 is in electrical communication with voltage $+V_{cc}$. A second end of a varistor 606, remote from the first end, is in electrical communication with voltage $-V_{cc}$. As such, any voltage level from +Vcc to -Vcc to the circuit path 604 may be applied to the input of amplifier 41 as a result of the position of the varistor 606. The resistor 608 is selected to be of a sufficiently low resistance not to limit current flow passing from the loop circuit 51 to the differential $I_B$ adjustment 602. The capacitor 616 limits excessive current flow from the loop circuit 51 from flowing to the amplifier 41 and the load resistor $R_L$. A certain amount of bias current $I_{B2}$-$I_{B1}$ flows from the loop circuit 51 into the differential $I_B$ adjustment 602 that is attached to ground.

The addition of the differential $I_B$ adjustment 602 allows for adjusting the relative current flowing through diodes d1 and diodes d2. This results since $I_{B1}$ is not constrained to equal $I_{B2}$ in the embodiment shown in FIG. 6. This adjustment of the currents flowing through the diodes d1 and d2 destroys the odd-symmetry of the loop circuit 51 of the predistortion circuit 32 that provides for the generation of even-order predistortion IMD.

Figure 7:
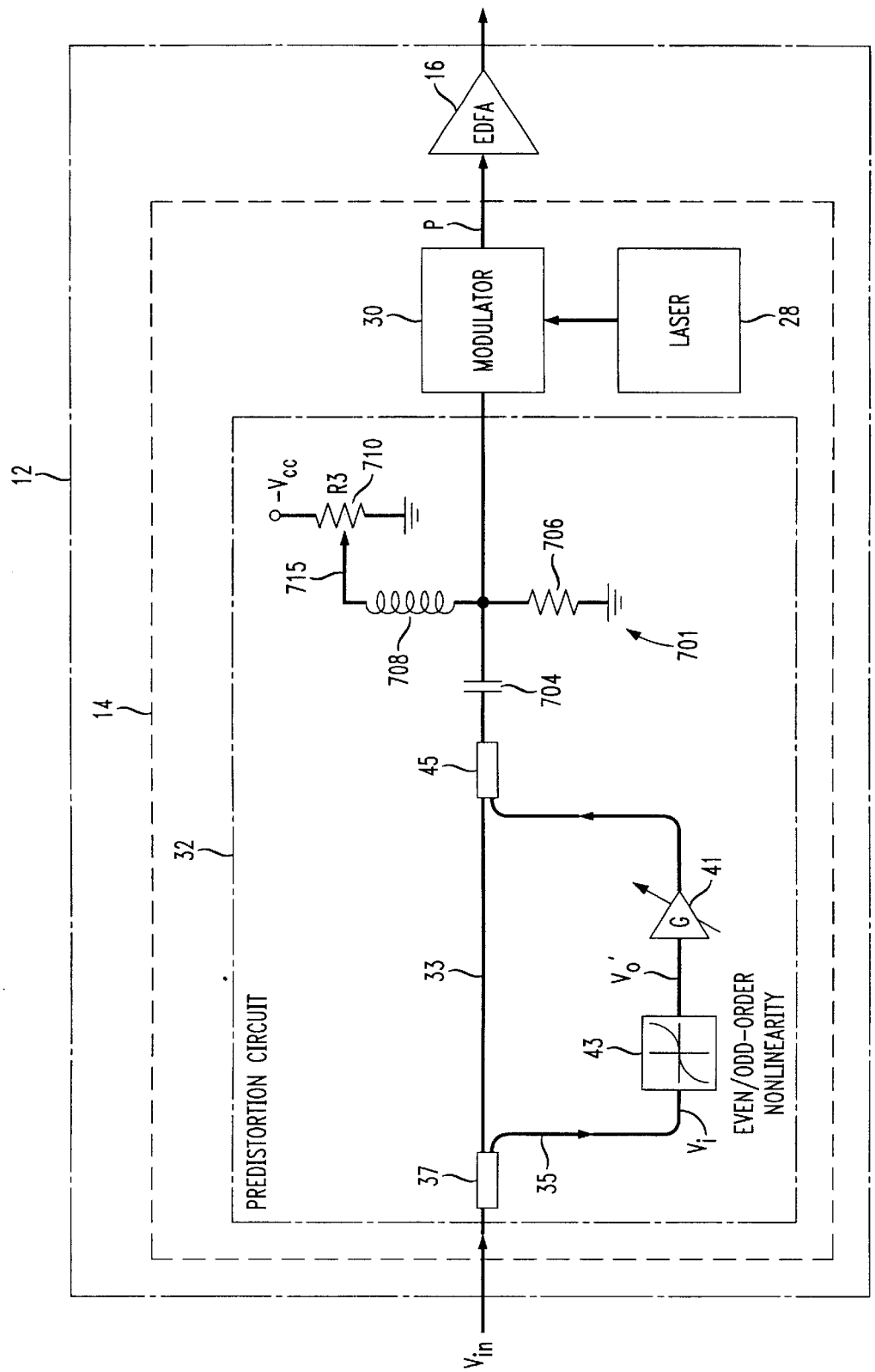
FIG. 7 shows an alternate embodiment of linearized optical transmitter from FIG. 2 that contain circuit components that can be adjusted to vary the voltage $V_B$.

FIG. 7 shows an alternate embodiment of predistortion circuit 32 that can generate a predistortion IMD to overcome the modulator IMD produced by the modulator 30. The predistortion circuit 32 further includes a capacitor 704, a resistor 706, an inductor 708, and a varistor 710. The varistor 710 has a variable resistance R3 that can be variably controlled, and is electrically connected between a negative voltage source $-V_{cc}$ and ground. The inductor 708 is connected between the varistor 710 and the modulator. The inductor 708 isolates the signal path (from the capacitor to the modulator) from the varistor 710. The resistor 706 is also connected to the input of the modulator 30. The resistor 706 is electrically connected at its remote end to ground. The output of the output directional coupler 45 is connected to the capacitor 704 that isolates the predistortion circuit from the bias current in the modulator. The $V_B$ controller operates by varying the voltage $V_v$ applied to point 715. Due to the location of the capacitor 704, electric bias current is limited from flowing from the varistor 710 via the inductor 708 and the capacitor 704 to the delay line 33 and the line 35. Instead, the bias current flowing from the varistor 710 to the inductor 708 flows substantially either through the modulator 30, or through the load resistor 706 to ground.

FIGS. 5–7 provide three separate embodiments of circuit 32 that can be controlled to adjust either current, current differential, or voltages that are applied to the modulator 30.

In the FIG. 5 embodiment, the varistor 86 has a variable resistance R1 that is varied to adjust the current $I_B$ that flows within the loop circuit 51. In the embodiment of circuit shown in FIG. 6, the varistor 606 has a variable resistance R2 that can be varied to adjust the difference in currents between bias currents $I_{B2}$ and $I_{B1}$. In the embodiment of predistortion circuit shown in FIG. 7, the varistor 710 has a variable resistance R3 that can be controlled to adjust the bias voltage $V_B$ that is applied to the modulator. In FIGS. 5 to 7, the gain G of the amplifier 41 can be adjusted to provide an additional control element. The modification to the embodiment of predistortion circuit 32 shown in FIG. 4, as indicated by the embodiments of predistortion circuits in FIGS. 5, 6, and 7 can be provided together or individually. For example, if it is desired to provide a predistortion circuit that compensates for nonlinearities in the transfer function through four distinct orders (the second-order through the fifth-order) as a result of the corresponding order of modulator IMD. Three embodiments controls indicated by FIGS. 5–7 will then be used in combination with the gain G of the amplifier 41. If, e.g., it is desired to only control three levels of nonlinearities in the modulator 30, then two of the control elements shown in the embodiments in FIGS. 5–7 are utilized in addition to the gain G of the amplifier 41. If it is desired to add only two orders of linearization to the transfer function of the modulator 30, then only one of the control circuits shown in the embodiments in FIGS. 5–7 are utilized in addition to the gain G of the amplifier 41. These control elements may be used in combination or individually to generate predistortion IMD that compensate for modulator IMD.

Figure 9:
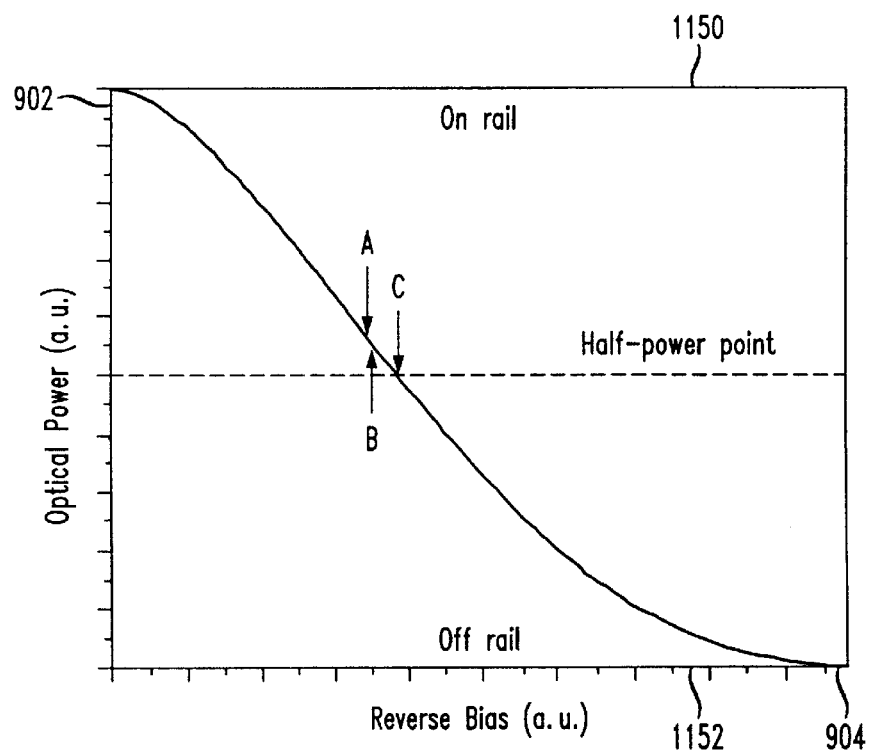
FIG. 9 shows one embodiment of EA modulator transfer function.
Figure 10:
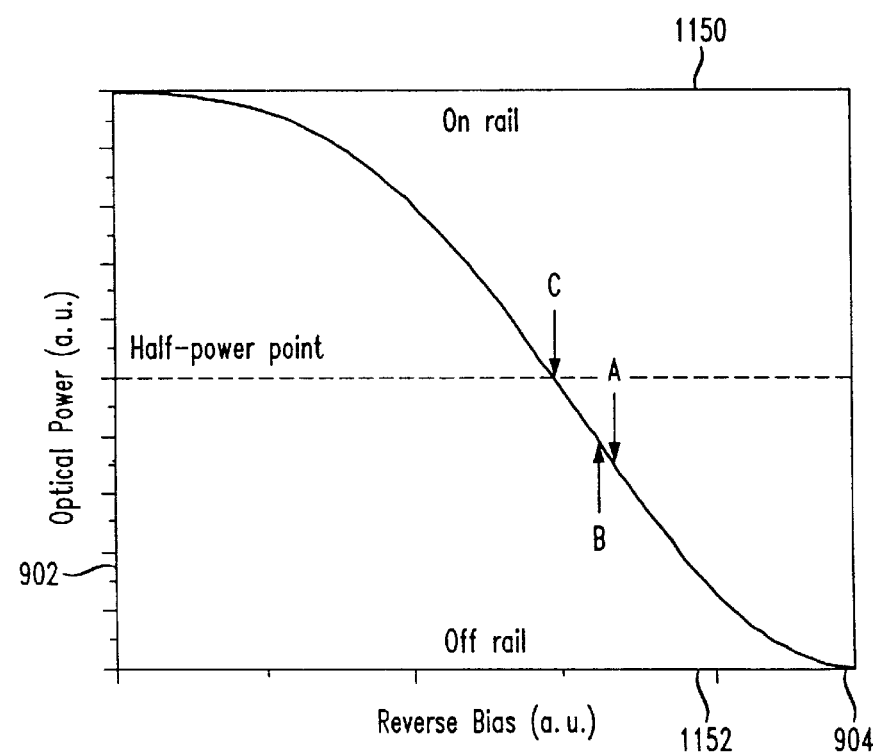
FIG. 10 shows another embodiment of EA modulator transfer function.

Linearizing EA Modulators:

FIGS. 9 and 10 show two embodiments of exemplary transfer function for an EA modulator. In FIGS. 9 and 10, the ordinate 902 is optical power output from the modulator 30 that is plotted as a function of the reverse bias, the abscissa 904. The curves in FIGS. 9 and 10 are shown to indicate biasing of the modulator. Biasing the modulator 30 at the inflexion point A nulls generation of $2^{nd}$-order modulator IMD, since the inflection point, which by definition is a point of the transfer function curve where the second derivative of the curve equals 0, exhibits odd-order symmetry. If the transfer function exhibits odd-order symmetry about the inflection point A, then higher even-order predistortion IMD will be zero, and the even-order predistortion IMD parameterized by the composite second-order CSO distortion is zero. Such is the case with an ideal Mach-Zehnder modulator whose transfer function is a raised sine function. However, EA modulators do not, in general, have transfer functions with odd symmetry.

4th-order and higher even-order modulator IMD will, in general, be nonzero and contribute to CSO. If the modulator is overmodulated with a multicarrier input, these higher-order modulator IMD may contribute significantly to the CSO. The CSO is minimized at a bias point B where $4^{th}$ and higher-order modulator distortions partially limit the 2nd order modulator distortion.

Figure 11:
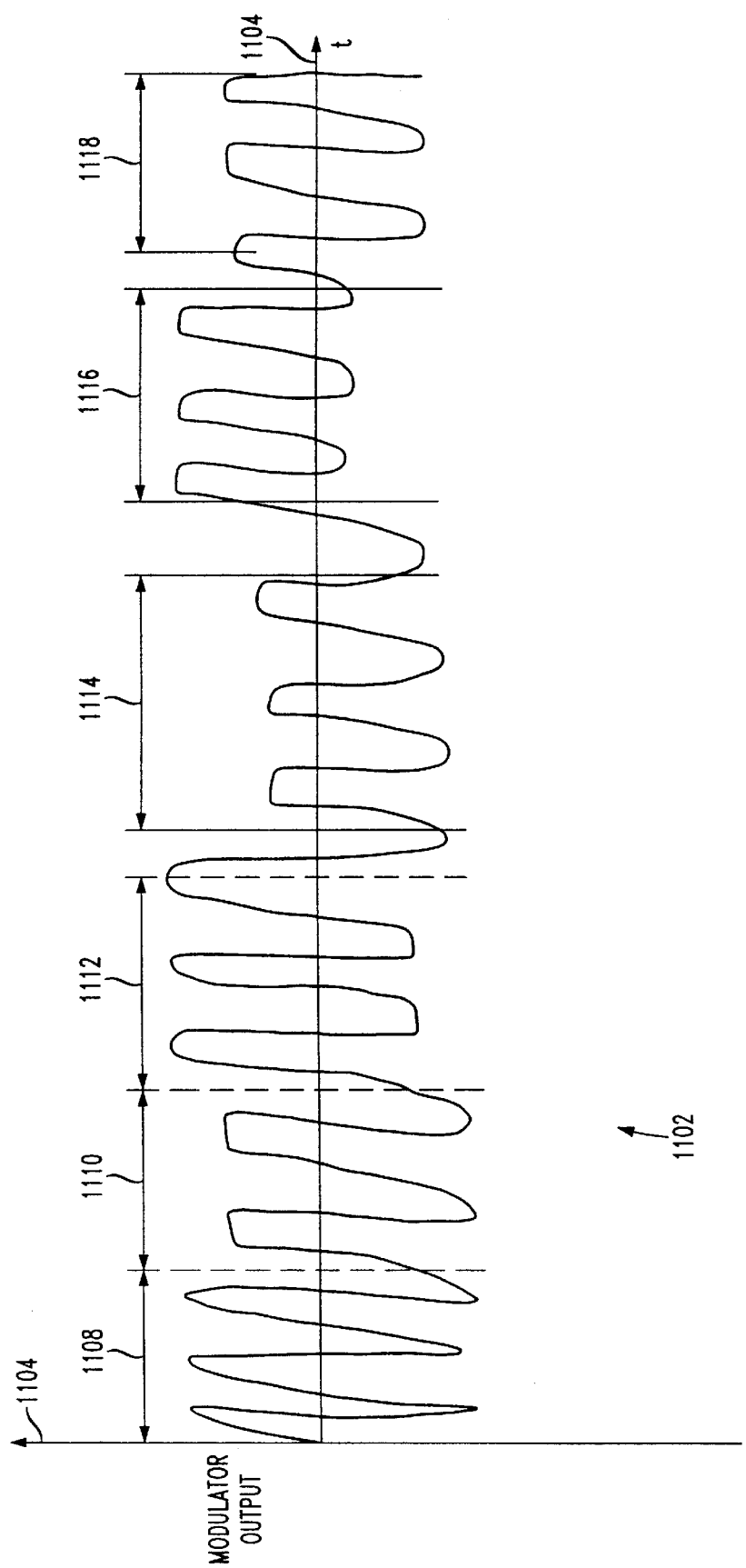
FIG. 11 shows one embodiment of a signal power versus time plot for the modulator of FIG. 2, including a plurality of exemplary signal plots.

FIG. 11 shows one exemplary embodiment of generation of output modulator photonic power as the ordinate 1102 that is plotted as a function of time, the abscissa 1104. The plot in FIG. 11 contains a series of sample optical waveforms 1108, 1110, 1112, 1114, 1116, and 1118, certain ones of which demonstrate clipped signals. A non-clipped waveform is shown at 1108. A waveform with the top clipped is shown at 1110. A waveform with its bottom clipped is shown at 1112. A waveform with a greater upper portion clipped than its lower portion is shown at 1116. A waveform with a lesser upper portion clipped than its lower portion is shown at 1118.

FIGS. 9 and 10 show an on rail 1150 and an off rail 1152. The on rail 1150 represents the greatest optical power amplitude that can be generated by the modulator. The off rail 1152 represents the smallest optical power amplitude that can be generated by the modulator. Any signal that contains a portion that is either above the on rail power or below the off rail power will result in a clipped power signal in which the respective on rail power or the off rail power is generated during that portion of the cycle. If the modulator transfer function deviates significantly from odd-symmetry, the minimum CSO may be unacceptably high at bias point B. The predistortion circuit then may then be able to generate predistortion to reduce the CSO. The inflection point A and the "optimal" bias point B are above the half-power point.

If the modulator is biased at either point A or point B in FIG. 9, the bias point is closer to the on rail than the off rail. Under these circumstances, the input signal to the modulator will more likely, and more frequently, drive the output photonic signal P of the modulator to the on-rail than the off-rail, and the resultant waveform will appear similar to either waveform 1110 or 1114 in FIG. 11. When the input is driven to or near either above the on-rail level or below the off-rail level, the output is "clipped".

The clipping shown in FIG. 11 is "hard", in which the edges of the clipped waveform are sharply cut off. In actuality, the clipping of a directly modulated laser is "soft" in which the edges of the clipped waveform are more rounded. The reason for the softening of the clipping in the directly modulated laser is because the slope of the transfer function does not exhibit a discontinuity at the rails. In principle, a Taylor series expansion shown in Eq. 3 can be used to approximate the entire modulator transfer function. High order terms in the expansion contribute significantly to clipping distortion.

Shifting the bias towards the half power point C in FIG. 9 reduces the amplitude of any on-rail clipping since the amplitude to the on-rail is increased, and makes the amount of on-rail clipping approximate the amount of off-rail clipping. The resultant waveform, when the bias is shifted, is more symmetric since the waveform is clipped more evenly above the half-power point compared to below the half-power point. Thus, even-order clipping distortion is reduced since the on-rail clipping is more symmetric to the off-rail clipping. However, CSO generated from low-order even harmonic distortion (i.e. $2^{nd}$-order) will be higher at bias point C than at point B because C is further from the inflection point. Fortunately, a small amount of even-order predistortion IMD can be generated by the predistortion circuit to limit this low-order harmonic distortion. In many cases, the resulting CSO will be lower than it was at bias point B without generating any even-order IMD.

Similarly, if the inflection point A is below the half power point as shown in FIG. 10, then the CSO will be minimized at some point B2 near A2 in the absence of even-order predistortion. The clipping will occur at the off-rail 115 with greater frequency than at the on-rail 1150. Therefore, the resultant waveform will appear similar to waveforms 1112 or 1116, shown in FIG. 11. Clipping induced CSO can be reduced by biasing the modulator near the half power point C2. If even-order predistortion IMD is added to the input signal, the CSO at a bias point near C2 can be lower than at point B2. The relative magnitudes of $I_{B1}$ and $I_{B2}$ required to generate an even-order predistortion IMD of the correct sign, to limit harmonic distortion and minimize the CSO, will be different for the two cases illustrated in FIGS. 9 and 10.

Figure 12:
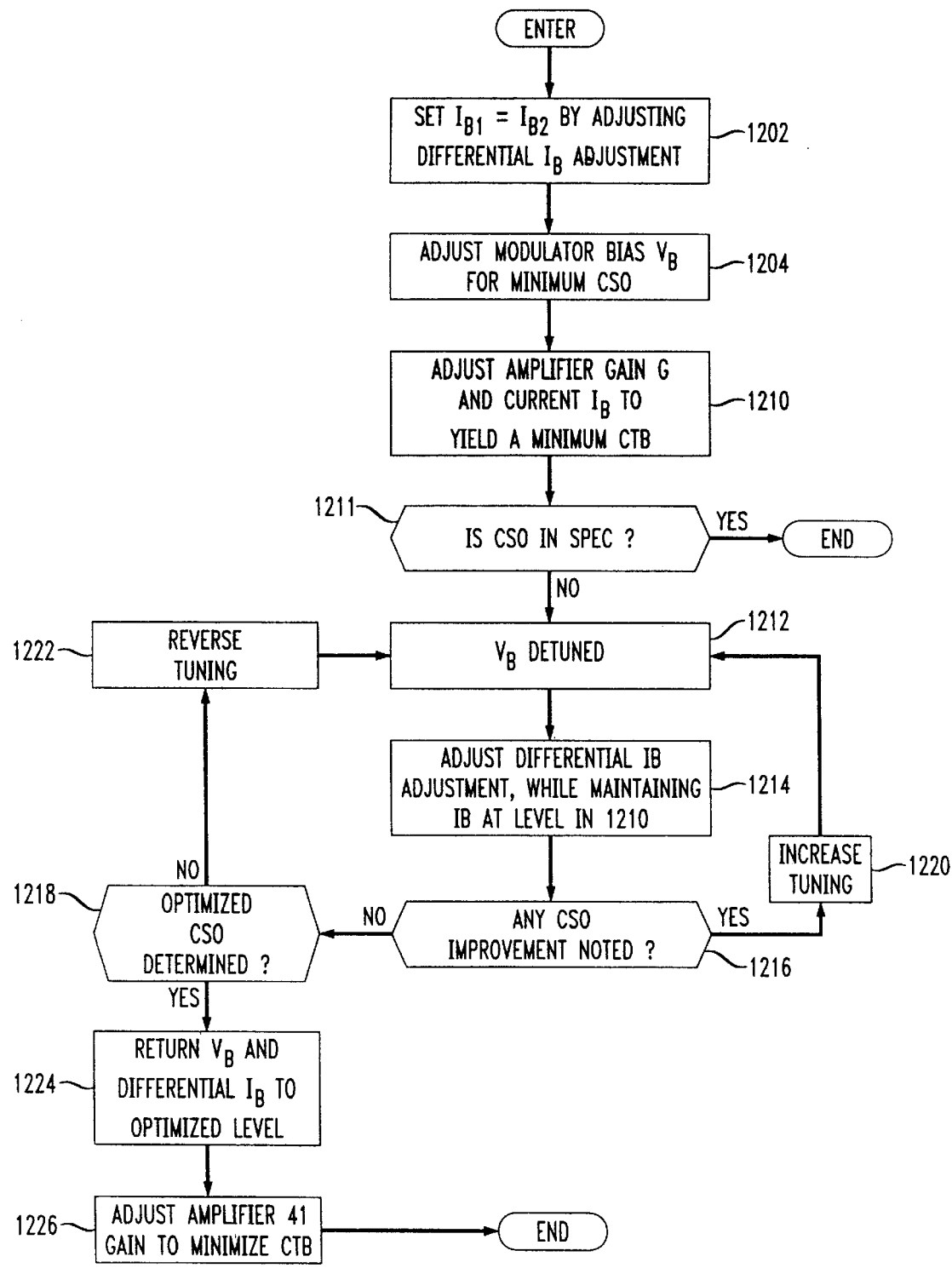
FIG. 12 shows one embodiment of linearity optimization method that can be used by a controller in deriving optimized IMD values.

Linearization Optimization:

One embodiment of an optimization program 1200 is shown in FIG. 12 that is preferably utilized either by a controller 222 (one embodiment of optimization program is shown in FIG. 12), or alternatively by a human operator. The optimization program 1200 optimizes the setting of the predistortion IMD. The controller 222 shown in FIG. 1 that runs the optimization program comprises a central processing unit (CPU) 260, a memory 262, a circuit portion 265, an input output interface (I/O) 279, and a bus (not shown). The controller 222 may be a general-purpose computer, a microprocessor, a microcontroller, or any other known suitable type of computer or controller. In a preferred embodiment, the controller 222 also includes a digital signal processing unit that permits the controller to sample, monitor, and control the analog signals, levels, currents, and voltages. The CPU 260 performs the processing and arithmetic operations for the controller 222. The controller 222 controls the transmission of signals within the linearized optical transmitter 12, and provides communications of the linearized optical transmitter 12 within the optical source distribution network 10.

The memory 262 includes random access memory (RAM) and read only memory (ROM) that together store the computer programs, operands, operators, etc. that are necessary to generate the predistortion IMD. The bus provides for digital information transmissions between CPU 260, circuit portion 265, memory 262, and I/O 279. The bus also connects I/O 279 to the portions of the ECP system 200 that either receive digital information from, or transmit digital information to, controller 222.

I/O 279 provides an interface to control the transmissions of digital information between each of the components in controller 222. I/O 279 also provides an interface between the components of the controller 222 and different portions of the ECP system 200. Circuit portion 265 comprises all of the other user interface devices, such as display and keyboard.

The parameters that can be adjusted to minimize the composite-triple-beat (CTB) and CSO of an EA modulator comprise the modulator bias $V_B$, the gain of the amplifier G, and the diode bias currents $I_{B1}$ and $I_{B2}$. Finding the absolute optimal adjustment of all these parameters could be time consuming. However, a relatively simple optimization program is provided that produces minimal CTB values and generally yields acceptably low CSO values. The optimization program is as follows:

Initially, in block 1202 of the embodiment of linear optimization method 1200 in FIG. 12, the value of bias current $I_B$ is set so $I_{B1}=I_{B2}$, e.g., by adjusting the differential $I_B$ adjustment 602 shown in the embodiment of FIG. 6. The linear optimization method 1200 continues in block 1204 by adjusting the modulator bias voltage $V_B$ by varying, for example, the resistance R3 of the varistor 710 in the $V_B$ controller 701 shown in the embodiment of FIG. 7 to obtain minimum CSO.

The linear optimization method 122 continues block 1210 in which the gain G in amplifier 16 is adjusted by, for example, adjusting the gain setting on the amplifier. The value of bias current $I_B$ (that equals both $I_{B1}$ and $I_{B2}$) are adjusted by varying the resistance R1 of varistor 86 of the $I_B$ controller segment 80 shown in FIG. 6. The values of both the gain G of amplifier 16 and $I_B$ are adjusted in block 1210 to yield a minimum CTB.

The method 1200 continues to decision block 1211 in which it is determined whether CSO is within specified limits, as outlined in e.g. the published recommended practices of the National Cable Television Association (NCTA). If the answer to decision block 1211 is yes, then method 1200 ends. If the answer to decision block 1211 is no, then the method continues to block 1212.

Method 1200 enters a loop portion consisting of blocks 1212, 1214, 1216, 1218, 1220, 1222, and 1224. In block 1212 of method 1200, the bias voltage $V_B$ is slightly de-tuned in one direction (either $V_B$ is increased or $V_B$ is decreased) by, for example, adjusting the resistance R3 of the $V_B$ controller 701 shown in the embodiment of FIG. 7. The bias voltage $V_B$ is adjusted in an effort to optimize CSO. The relative currents $I_{B1}$ and $I_{B1}$ can be adjusted to limit the CSO. The CSO is measured as outlined in NCTA recommended practices. Method 1200 continues in block 1214 in which $I_{B1}$ is increased and $I_{B2}$ simultaneously decreased, or vise-versa, by varying the resistance R2 of varistor 606 of the differential $I_B$ adjustment 602 shown in the embodiment of FIG. 6. During block 1214, the mean of the two currents $I_{B1}$ and $I_{BI}$ are maintained at roughly the same level as during block 1210.

Method 1200 continues to decision block 1216 in which any improvement in CSO is noted relative to prior to the previous tuning in block 1212. If no improvement in CSO is achieved, the method 1200 continues to decision block 1218 in which the controller determines whether the optimized CSO is achieved. During the first loop of elements 1212, 1214, 1216, etc., it is not possible to determine whether the optimized levels of $V_B$, $I_{B1}$, and $I_{B2}$ have been achieved. The method 1200 continues to block 1222 and block 1212 in which $V_B$ is tuned to the other side from its original tuning direction (i.e. if the original bias voltage $V_B$ tuning in block 1212 increases the voltage, then the second bias voltage $V_B$ tuning in block 1222 and 1212 will decrease the voltage, or vice versa). Following block 1212, the relative value of $I_{B1}$ and $I_{B2}$ are adjusted again to compensate the median value of $I_{B1}$ and $I_{B2}$ for the increase in the bias voltage $V_B$.

If during decision block 1216, an improvement in CSO is noted by the adjustment of $V_B$, $I_{B1}$, and $I_{B2}$, the method 1200 continues to block 1220 in which the modulator bias voltage $V_B$ continues to be tuned in the same direction (positive or negative), and $I_{B1}$ and $I_{B2}$ are adjusted. The method 1200 continues to block 1212 in an iterative fashion until the lowest CSO is achieved. When the lowest level of CSO is determined, then the levels of $V_B$ and $I_{B2}$-$I_{B1}$ are set to their optimized values in block 1224 to achieve the lowest value of CTB. Following block 1224, method 1200 continues to block 1226. If the mean value of $I_{B1}$ and $I_{B2}$ is unchanged following the above procedure, then the preceding CSO optimization will not have dramatically upset the CTB correction. The gain G in variable amplifier 41 is adjusted to minimize CTB. The CTB can be measured as outlined in the NCTA recommended practices.

The above circuit provides a predistortion circuit that can be used to generate both even-and odd-order IMD including the pair of antiparallel diodes d1 and d2. The predistortion circuit is contained in a single signal path, and thereby limits the circuit complexity, delay components to ensure that the timing for the signals to pass through each signal path is even, and expense associated with providing a predistortion circuit having multiple signal paths. The circuit disclosed herein has demonstrated CTB corrections of 22 dB. The predistorter also improves the CSO of an EA modulator.

Although various embodiments that incorporate the teachings of the present invention have been shown and described in detail herein, those skilled in the art can readily devise many other varied embodiments that still incorporate these teachings.

What is claimed is:

1. An optical transmitter, comprising:
   an optical modulator for modulating an input signal according to a non-linear function to produce a modulated output photonic signal;
   a predistortion circuit including a single antiparallel diode pair for imparting a predistortion intermodulation distortion (IMD) to said input signal tending to reduce the nonlinearity of said modulated output photonic signal, wherein the predistortion IMD is both even-order and odd-order, and
   wherein the single antiparallel diode pair produces both even-order and odd-order predistortion IMD.

2. The optical transmitter of claim 1, further comprising:
   a biasing circuit arrangement coupled to said antiparallel diode pair for causing D.C. bias current to flow through each of said diodes, and
   a load impedance coupled to said single antiparallel diode pair for extracting signal current therefrom.

3. The optical transmitter of claim 2, wherein input to said nonlinear signal path incident on said single antiparallel diode pair produces significant even-order predistortion IMD and odd-order predistortion IMD.

4. The optical transmitter of claim 1, wherein the predistortion circuit generates both even and odd-order predistortion IMD in a single path.

5. The optical transmitter of claim 1, wherein said modulated optical source comprises a directly modulated diode laser.

6. The optical transmitter of claim 1, wherein said modulated optical source comprises an externally modulated laser.

7. The optical transmitter of claim 1, wherein the predistortion IMD is applied to the input signal to limit modulator IMD in the output photonic signal.

8. The optical transmitter of claim 1, wherein the input signal is a time varying electric input signal.

9. The optical transmitter of claim 1, wherein the output photonic signal is a time varying output photonic signal.

10. The optical transmitter of claim 1, wherein the predistortion IMD is substantially equal in magnitude and opposite in phase, considered downstream of the modulator, to those associated with said nonlinearity of said modulator IMD.

11. An optical transmitter, comprising:
    an optical modulator for modulating an input signal according to a non-linear function to produce a modulated output photonic signal; and
    a predistortion circuit including an antiparallel diode arrangement for imparting a predistortion intermodulation distortion (IMD) to said input signal tending to reduce the nonlinearity of said modulated output photonic signal, wherein the predistortion IMD is both even-order and odd-order,
    wherein the predistortion circuit comprises:
      a power splitter for dividing said input signal;
      a linear signal path having a delay for receiving a first portion of said input signal and for providing a first output signal portion;
      a nonlinear signal path for receiving a second portion of the input signal and for providing a second output signal, said nonlinear signal path having substantially the same delay as said linear signal path and including an antiparallel diode arrangement;
      a biasing circuit arrangement coupled to said antiparallel diode arrangement for causing D.C. bias current to flow through each of said diodes; and a power combiner for recombining said linear and nonlinear signal paths, whereby said antiparallel diode arrangement is responsive to said second input signal portion to introduce significant even order predistortion IMD and odd order predistortion IMD.

12. The optical transmitter of claim 11, wherein the power combiner forms a second output signal portion, wherein said biasing circuit arrangement is operable to control the relative magnitude and sign between said significant even order predistortion IMD and odd order predistortion IMD.

13. The optical transmitter of claim 1, wherein the non-linear signal path further includes a gain varying arrangement coupled to said antiparallel diode arrangement for varying the amplitude of the second output signal portion relative to said first output signal portion, and wherein said first and second output signals are combined at said combiner to form said predistortion signal.

14. The optical transmitter of claim 13, wherein said gain varying arrangement includes a variable attenuator.

15. The optical transmitter of claim 13, wherein said gain varying arrangement includes a variable gain amplifier.

16. A method of limiting modulator IMD in an optical transmitter, the method comprising:

modulating an input signal according to a non-linear function to produce a modulated output photonic signal;

imparting a predistortion intermodulation distortion (IMD) to said input signal tending to reduce the non-linearity of said modulated output photonic signal, wherein the predistortion IMD is both even-order and odd-order and both the even-order predistortion IMD and the odd-order predistortion IMD are generated with an antiparallel diode pair.

17. The method of claim 16, wherein the predistortion IMD is substantially equal in magnitude and opposite in phase to those associated with said modulator IMD.

18. The method of claim 16, further comprising containing the optical transmitter in a single transmitter path.

19. A linearized optical transmitter for transmitting multiple subcarrier signals via an optical medium, comprising:

an optical modulator for modulating a time varying electrical input signal to supply a modulated output photonic signal according to a nonlinear transfer function, the nonlinearity of the nonlinearity transfer function including a modulator intermodulation distortion (IMD); and a predistortion circuit for supplying a predistorted signal including predistortion IMD that is substantially equal in magnitude and opposite in phase to those associated with said modulator IMD, wherein both even-order and odd order predistortion IMD in the output photonic signal are generated to limit the modulator IMD of the modulator through the fifth order, wherein said predistortion circuit includes four adjustable parameters thereby providing four degrees of freedom.

20. The optical transmitter of claim 19, wherein said adjustable parameters include a diode bias current adjustment, a differential diode bias current adjustment, a bias voltage adjustment, and an amplifier gain adjustment.

21. The optical transmitter of claim 20, wherein said optical source comprises a directly modulated, diode laser.

22. The optical transmitter of claim 19, wherein said modulated optical source comprises an externally modulated laser.

23. The optical transmitter of claim 19, wherein one of said adjustable parameters include adjusting the voltage applied to the input of the modulator.

24. The optical transmitter of claim 19, wherein said predistortion circuit comprises an antiparallel diode arrangement.

25. The optical transmitter of claim 24, wherein one of said adjustable parameters involves adjusting the relative current flowing through each diode in said antiparallel diode arrangement.

26. A method of generating predistortion IMD in a predistortion circuit including an antiparallel diode pair and an amplifier, the method comprising:

adjusting a bias voltage applied to the predistortion circuit;

adjusting a bias current in the predistortion circuit;

adjusting a gain of the amplifier; and adjusting a differential bias current flowing through each diode in an antiparallel diode pair.

27. The method of claim 26, wherein the bias voltage, the bias current, the gain of the amplifier, and the differential bias current can be iteratively adjusted to generate both even-order and odd-order predistortion IMD.

28. The method of claim 26, wherein the optimization of the predistortion IMD is achieved by the method.

29. An apparatus that generates predistortion IMD in a predistortion circuit including an antiparallel diode pair and an amplifier, the apparatus comprises:

means for adjusting a bias voltage applied to the predistortion circuit;

means for adjusting a bias current in the predistortion circuit;

means for adjusting a gain of the amplifier; and means for adjusting a differential bias current flowing through each diode in the antiparallel diode pair.

30. The apparatus of claim 29, wherein the bias voltage, the bias current, the gain of the amplifier, and the differential bias current can be iteratively adjusted to generate both the even-order and odd-order predistortion IMD.

* * * * *

UNITED STATES PATENT AND TRADEMARK OFFICE
CERTIFICATE OF CORRECTION

PATENT NO. : 6,917,764 B1  Page 1 of 1
APPLICATION NO. : 09/675434
DATED : July 12, 2005
INVENTOR(S) : Wilson It is certified that error appears in the above-identified patent and that said Letters Patent is hereby corrected as shown below:

In the Claims

Column 15, line 11, Claim 13   Delete "claim 1",
                                Insert --claim 11--

Signed and Sealed this

Twenty-second Day of August, 2006

JON W. DUDAS
*Director of the United States Patent and Trademark Office*